(12) United States Patent
Ma et al.

(10) Patent No.: US 10,481,719 B2
(45) Date of Patent: Nov. 19, 2019

(54) DISPLAY DEVICE

(71) Applicant: Shanghai Tianma Micro-Electronics Co., Ltd., Shanghai (CN)

(72) Inventors: Shaolong Ma, Shanghai (CN); Liang Liu, Shanghai (CN); Feng Lu, Shanghai (CN); Qijun Yao, Shanghai (CN)

(73) Assignee: SHANGHAI TIANMA MICRO-ELECTRONICS CO., LTD., Shanghai (CN)

( * ) Notice: Subject to any disclaimer, the term of this patent is extended or adjusted under 35 U.S.C. 154(b) by 4 days.

(21) Appl. No.: 15/959,569

(22) Filed: Apr. 23, 2018

(65) Prior Publication Data
US 2019/0204977 A1      Jul. 4, 2019

(30) Foreign Application Priority Data
Jan. 3, 2018 (CN) .......................... 2018 1 0004461

(51) Int. Cl.
*G06F 3/041* (2006.01)
*G06F 3/047* (2006.01)

(52) U.S. Cl.
CPC ............ *G06F 3/0414* (2013.01); *G06F 3/047* (2013.01); *G06F 3/0412* (2013.01); *G06F 3/0416* (2013.01)

(58) Field of Classification Search
CPC combination set(s) only.
See application file for complete search history.

(56) References Cited

U.S. PATENT DOCUMENTS

| | | | |
|---|---|---|---|
| 2010/0149117 A1* | 6/2010 | Chien | G06F 3/0412 345/173 |
| 2014/0204285 A1* | 7/2014 | Jang | G06F 3/044 349/12 |
| 2014/0368228 A1* | 12/2014 | Kim | G02F 1/1309 324/750.3 |
| 2016/0103544 A1* | 4/2016 | Filiz | G06F 3/0414 345/174 |
| 2017/0003811 A1* | 1/2017 | Lu | G06F 3/0416 |
| 2017/0220191 A1* | 8/2017 | Liu | G06F 3/0412 |
| 2017/0269756 A1* | 9/2017 | Wang | G06F 3/0414 |
| 2017/0277296 A1* | 9/2017 | Reynolds | G06F 3/044 |
| 2017/0308197 A1* | 10/2017 | Campbell | G06F 3/0418 |
| 2017/0371472 A1* | 12/2017 | Qian | G06F 3/0414 |
| 2018/0004336 A1* | 1/2018 | Shepelev | G06F 3/0416 |
| 2018/0039362 A1* | 2/2018 | Liu | G02F 1/13338 |
| 2018/0039369 A1* | 2/2018 | Liu | G06F 3/045 |
| 2018/0040673 A1* | 2/2018 | Zeng | G06F 3/0421 |
| 2018/0040674 A1* | 2/2018 | Du | G06F 3/0414 |

(Continued)

*Primary Examiner* — Priyank J Shah
(74) *Attorney, Agent, or Firm* — Tarolli, Sundheim, Covell & Tummino LLP

(57) ABSTRACT

Embodiments of the present disclosure provide a display device comprising a display panel, a force sensing unit and a processing unit, the display panel comprises a display portion and a non-display portion; the force sensing unit is provided in a non-wiring portion of the non-display portion, and the force sensing unit is configured to sense a force applied on the display panel and output a force signal corresponding to the force; and the processing unit is connected to the force sensing unit and is configured to control the display portion to display a preset functional interface according to the force signal output from the force sensing unit.

15 Claims, 10 Drawing Sheets

(56) References Cited

U.S. PATENT DOCUMENTS

| | | | |
|---|---|---|---|
| 2018/0046286 A1* | 2/2018 | Zhou | G06F 3/0414 |
| 2018/0053466 A1* | 2/2018 | Zhang | H01L 51/0031 |
| 2018/0063420 A1* | 3/2018 | Kang | G06K 9/00604 |
| 2018/0067587 A1* | 3/2018 | Yao | G06F 3/044 |
| 2018/0074622 A1* | 3/2018 | Zhu | G01L 1/2293 |
| 2018/0081476 A1* | 3/2018 | Ma | G06F 3/0412 |
| 2018/0129330 A1* | 5/2018 | Ding | G06F 3/0412 |
| 2018/0129332 A1* | 5/2018 | Leng | G01L 1/2262 |
| 2018/0129343 A1* | 5/2018 | Zhai | G06F 3/0416 |
| 2018/0130543 A1* | 5/2018 | Zhu | G11C 19/28 |
| 2018/0143716 A1* | 5/2018 | Choi | G06F 3/0414 |
| 2018/0157373 A1* | 6/2018 | Tu | G09G 3/20 |
| 2018/0173347 A1* | 6/2018 | Liu | G06F 3/041 |
| 2018/0188877 A1* | 7/2018 | Cai | G06F 3/0414 |
| 2018/0196566 A1* | 7/2018 | Lu | G06F 3/0412 |
| 2018/0232092 A1* | 8/2018 | Lee | G06F 21/32 |
| 2018/0284937 A1* | 10/2018 | Grunthaner | G06F 3/041 |
| 2019/0004659 A1* | 1/2019 | Bian | G06F 3/0414 |
| 2019/0025922 A1* | 1/2019 | Lu | G06F 3/016 |
| 2019/0064985 A1* | 2/2019 | Zhu | G06F 3/0412 |
| 2019/0064986 A1* | 2/2019 | Lu | G06F 3/0414 |
| 2019/0064987 A1* | 2/2019 | Lu | G06F 3/0414 |
| 2019/0094588 A1* | 3/2019 | Guan | G09G 3/20 |
| 2019/0155449 A1* | 5/2019 | Goo | G06F 3/0418 |

* cited by examiner

DISPLAY DEVICE

CROSS-REFERENCE TO RELATED APPLICATIONS

The present application claims priority to Chinese Patent Application No. 201810004461.4, filed on Jan. 3, 2018, the content of which is incorporated herein by reference in its entirety.

TECHNICAL FIELD

The present disclosure relates to the field of display technologies and, in particular, to a display device.

BACKGROUND

At present, most conventional display devices have a home key at the lower border; when there is a need to invoke the functional interface, a certain force is applied to the portion where the home key is located, so as to invoke of the functional interface. With the development of display technology, full screen design of the display device is becoming the developing trend. If a home key was arranged at the lower border of the display device, since the home key occupies a large area, then the lower border needs to preserve a sufficient width for the home key. This will leads to a wide border, which is adverse to the full screen design.

In order to solve the above problem, a dummy home key is generally adopted to replace the physical home key. However, the dummy home key is not convenient during use, and thus the user experience is poor.

SUMMARY

In view of the above, embodiments of the present disclosure provide a display device, so as to solve the problem in the related art that the home key leads to a wide border.

The present disclosure provides a display device, including a display panel, a force sensing unit and a processing unit. The display panel comprises a display portion and a non-display portion. The force sensing unit is provided in a non-wiring portion of the non-display portion to sense a force applied on the display panel and output a force signal corresponding to the force. The processing unit is connected to the force sensing unit to control the display portion to display a preset functional interface according to the force signal output from the force sensing unit.

According to the properties of the force sensing unit, when the periphery portion of the force sensing unit is applied with a force, the force can be sensed by the force sensing unit, and the force sensing unit outputs a corresponding force signal according to the force sensed, when the output force signal exceeds a threshold force signal, the processing unit controls the display portion of the display panel to display the preset functional interface. It can be seen that, based on the cooperation of the force sensing unit and the processing unit, applying a certain force on the display panel can invoke the functional interface. Therefore, by adopting the display device provided by the present disclosure, there is no need to provide an individual home key which may occupy a large area at the border of the display panel, so as to reduce width of the border and thus achieve a full screen design.

BRIEF DESCRIPTION OF DRAWINGS

In order to more clearly illustrate technical solutions of the present disclosure, the accompanying drawings are briefly introduced as follows. The drawings described only show some embodiments of the present disclosure. For those skilled in the art, other drawings can also be obtained according to these drawings without creative efforts.

DESCRIPTION OF EMBODIMENTS

In order to better understand technical solutions of the present disclosure, the embodiments of the present disclosure will be described in detail as follows.

It should be understood that, the embodiments described as below are only a part of the embodiments, rather than all of them. Based on the embodiments of the present disclosure, any other embodiment obtained by those skilled in the art shall fall into the protection scope of the present disclosure.

The terms used in the present disclosure are only for the purpose of describing specific embodiments, rather than providing limitations to the present disclosure. The singular forms "a", "an", "the" and "said" used in the embodiments of the present disclosure and the appended claims also include plural forms thereof, unless otherwise noted in the context.

It should be understood that, the term "and/or" used in the present disclosure only shows an association relation of associated objects, which can represent three relations. For example, A and/or B can represent: only A, both A and B, and only B. In addition, the character "/" in the present disclosure generally represents an "or" relation of associated objects.

It should be understood that, although the terms "first", "second" and "third" may be used to describe pins, the pins are not limited by these terms. These terms are merely used to distinguish the pins from one another. For example, without departing from the protection scope of the present disclosure, a first pin may also be called a second pin. Similarly, a second pin may also be called a first pin.

Figure 1:
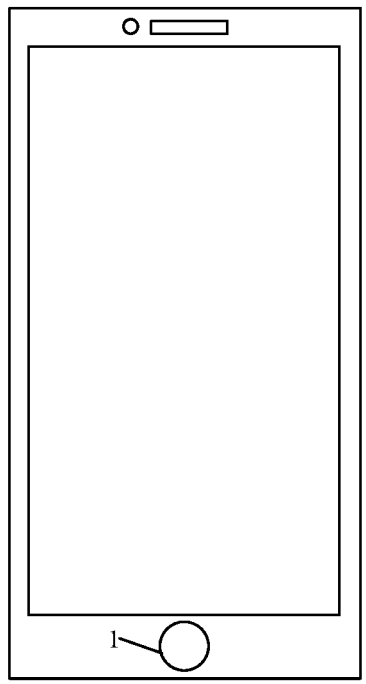
FIG. 1 is a structural schematic diagram of a display device in the prior art.

FIG. 1 shows a physical home key design of the prior art. It can be clearly seen in FIG. 1 that the physical home key 1 occupies a certain space of the lower border, which is not beneficial for a full screen design.

Figure 2:
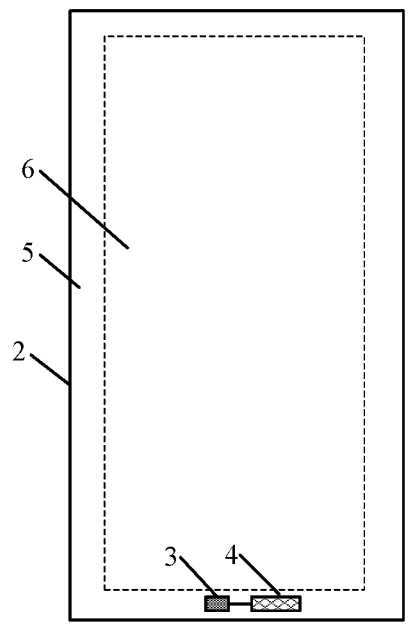
FIG. 2 is a first structural schematic diagram of a display device according to an embodiment of the present disclosure.

An embodiment of the present disclosure provides a display device, as shown in FIG. 2, where FIG. 2 is a first structural schematic diagram of a display device according to an embodiment of the present disclosure. The display device includes a display panel 2, a force sensing unit 3 and a processing unit 4. The display panel 2 includes a non-display portion 5 and a display portion 6. The force sensing unit 3 is provided in a non-wiring portion of the non-display portion 5 and is used to sense a force applied on the display panel 2 and output a corresponding force signal. The processing unit 4 is connected to the force sensing unit 3 and is used to control the display portion 6 to display a preset functional interface according to the force signal output from the force sensing unit 3.

It should be noted that, the non-wiring portion is a portion of the display panel in which no wiring is arranged. Generally, the wirings in the display panel are configured to transmit various signals needed by the display panel, and the non-wiring portion can be an independent non-wiring portion or can be an idle portion between adjacent wirings. Alternatively, the non-display portion 5 further includes a dummy wiring portion. Some dummy wirings which do not have actual functions are provided in the dummy wiring portion. That is, the dummy wirings do not transmit any signal, but can be made in the display panel in the same process as the normal wirings. Generally, a sealant (not shown in the figures) needs to be provided in the non-display portion 5 by surrounding the display portion 6, for encapsulating the display panel, which will be described in detail as follows. The sealant overlaps the wirings on the display panel, and thus the dummy wirings are used to keep uniformity of the wirings in the non-display portion 5 of the display panel, so as to prevent non-uniform curing of the sealant in different portions, thereby avoiding adverse influences on the performance of the display panel. When arranging the force sensing unit 3, some of the dummy wirings may be removed, and the force sensing unit 3 is provided in an idle portion formed after the dummy wirings are removed. The idle portion formed by removing dummy wirings also belongs to the non-wiring portion.

In addition, it should be noted that the force sensing unit 3 in FIG. 2 is merely illustrative, and in an actual situation, compared with the area occupied by the home key, the force sensing unit 3 occupies a much smaller area in the non-display portion 5.

According to the properties of the force sensing unit 3, when a periphery portion of the force sensing unit 3 is subjected to a force, the force can be sensed by the force sensing unit 3, and the force sensing unit 3 outputs a corresponding force signal according to the force sensed. When the output force signal is exceeds or is greater than a threshold force signal, the processing unit 4 controls the display portion 6 of the display panel 2 to display the preset functional interface. That is, based on the cooperation between the force sensing unit 3 and the processing unit 4, applying a certain force on the display panel 2 can invoke the functional interface. Therefore, by adopting the display device provided by the present embodiment, there is no need to provide an individual home key which may occupy a large area at the border of the display panel 2, so as to reduce the width of the border and thus achieve a full screen design.

Figure 3:
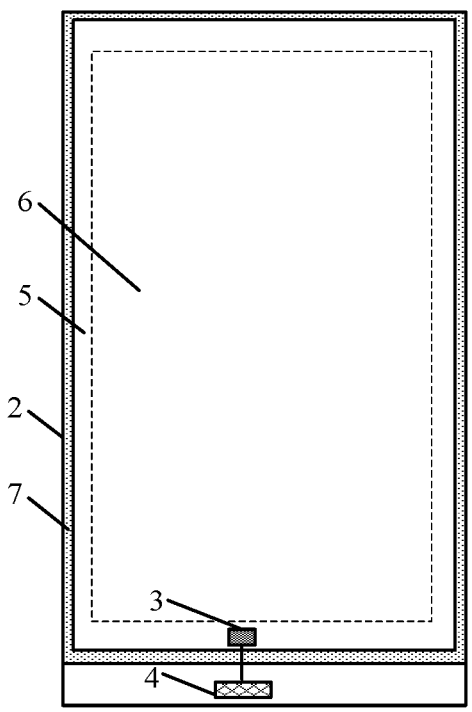
FIG. 3 is a second structural schematic diagram of a display device according to an embodiment of the present disclosure.

It can be understood that the display panel 2 includes a first substrate and a second substrate opposite to each other. During a manufacturing process of the display substrate 2, the first substrate and the second substrate need to be aligned and encapsulated. If the display panel 2 is a liquid crystal display panel, then the first substrate can be an array substrate and the second substrate can be a color film substrate; and if the display panel 2 is an organic light-emitting display panel, then the first substrate can be an array substrate and the second substrate can be an encapsulation substrate. On the basis of this, as shown in FIG. 3, where FIG. 3 is a second structural schematic diagram of a display device according to an embodiment of the present disclosure, a sealant 7 is further provided in the non-display portion 5 of the display panel 2, for encapsulating the first substrate and the second substrate. When the non-display portion 5 is provided with the sealant 7, in order to more accurately sense the force applied on the display panel 2, the force sensing unit 3 can be arranged on an inner side of the sealant 7, that is, a side of the sealant 7 facing toward the display portion 6.

Figure 4:
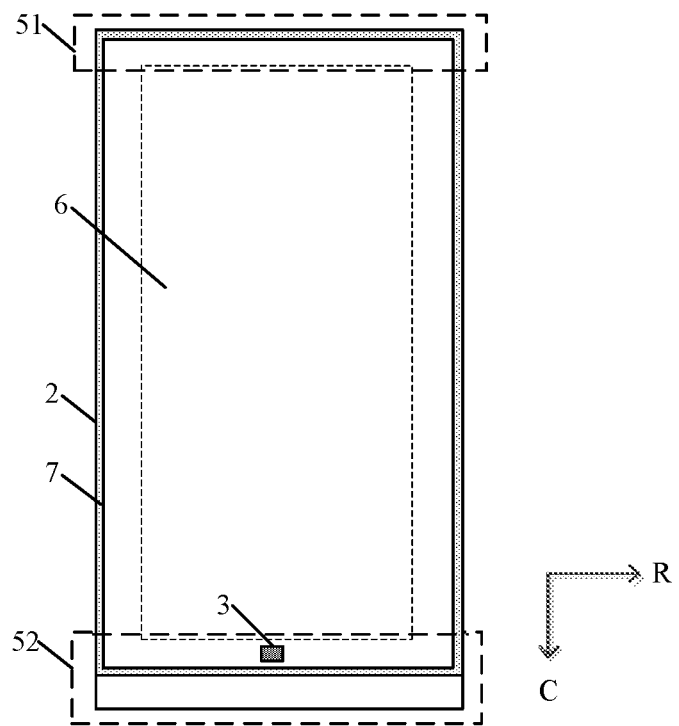
FIG. 4 is a third structural schematic diagram of a display device according to an embodiment of the present disclosure.

As shown in FIG. 4, where FIG. 4 is a third structural schematic diagram of a display device according to an embodiment of the present disclosure, the non-display portion 5 of the display panel 2 includes an upper side non-display portion 51 and a lower side non-display portion 52 arranged along a first direction C. The lower side non-display portion 52 refers to a portion of the non-display portion 5 including a bonding portion.

In one embodiment, the number of the force sensing unit 3 can be one or more.

When there is only one force sensing unit 3, if the force sensing unit 3 is provided in a left portion of the lower side non-display portion 52, then when a right portion of the display panel 2 is subjected to a certain force, since the force sensing unit 3 is relatively far from the position where the force is applied, the force sensing unit 3 may not accurately sense the force. Similarly, if the force sensing unit 3 is provided on a right portion of the lower side non-display portion 52, then when a left portion of the display panel 2 is subjected to a certain force, since the force sensing unit 3 is relatively far from the position where the force is applied, the force sensing unit 3 may not accurately sense the force.

Figure 5:
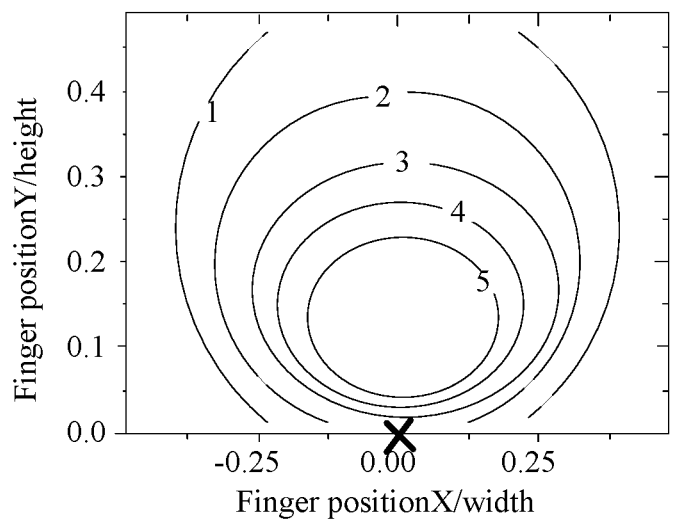
FIG. 5 is a first simulation diagram showing a force sensing range of a force sensing unit according to an embodiment of the present disclosure.

In order to overcome the above problems, please further refer to FIG. 4, where the force sensing unit 3 is arranged in a non-wiring portion at a middle position of the lower side non-display portion 52. As shown in FIG. 5, FIG. 5 is a simulation diagram showing a force sensing response range of a force sensing unit in a situation in which the force sensing unit 3 is arranged in the middle position of the lower side non-display portion 52 according to an embodiment of the present disclosure. In FIG. 5, the horizontal and vertical coordinates present a proportional relation between a width and a length of the display portion 6. The width of the display portion 6 is a length of the display portion 6 along a second direction R and the length of the display portion 6 is a length of the display portion 6 along a first direction C. The first direction C and the second direction R are perpendicular to each other. When a certain force is applied to the display panel 2 and the display panel 2 is deformed, a sensing intensity of the force sensing unit 3 with respect to the deformation gradually decreases from a portion defined by an innermost curve to a periphery portion. Based on the force sensing response range shown in FIG. 5, it can be known that, no matter the force is applied to either the left portion or the right portion of the display panel 2, the force sensing unit 3 can sense the deformation, so as to accurately sense the force applied.

Figure 6:
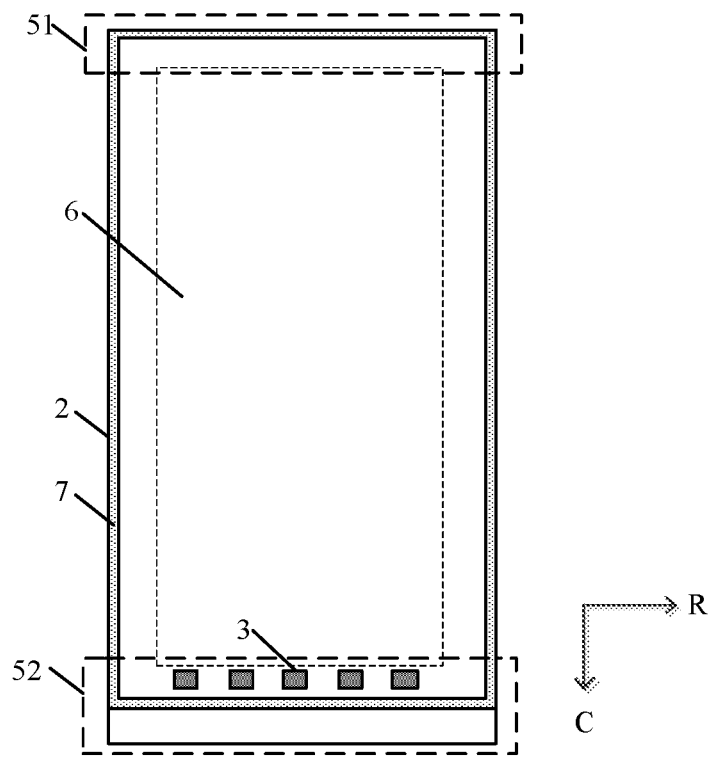
FIG. 6 is a fourth structural schematic diagram of a display device according to an embodiment of the present disclosure.

In order to enlarge the force sensing range, as shown in FIG. 6, where FIG. 6 is a fourth structural schematic diagram of a display device according to an embodiment of the present disclosure, the display panel 2 is provided with a plurality of force sensing units 3, and the plurality of force sensing units 3 can be uniformly distributed in the non-wiring portion of the lower side non-display portion 52. The uniform distribution refers to a situation in which a distance between any two adjacent force sensing units 3 is identical in the second direction R.

Figure 7:
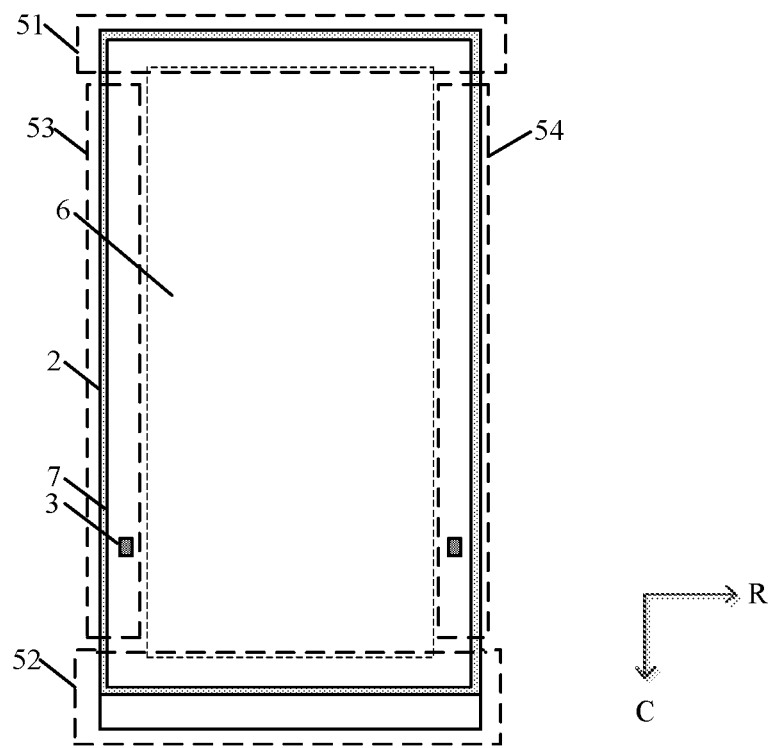
FIG. 7 is a fifth structural schematic diagram of a display device according to an embodiment of the present disclosure.

As shown in FIG. 7, where FIG. 7 is a fifth structural schematic diagram of a display device according to an embodiment of the present disclosure, the non-display portion 5 of the display panel 2 further includes a left side non-display portion 53 and a right side non-display portion 54 arranged along the second direction R, in addition to the upper side non-display portion 51 and the lower side non-display portion 52 arranged along the first direction C.

In one embodiment, please refer to FIG. 7, where the force sensing unit 3 is arranged in a first non-wiring portion and/or a second non-wiring portion. The first non-wiring portion is a non-wiring portion of the left side non-display portion 53 close to the lower side non-display portion 52, and the second non-wiring portion is a non-wiring portion of the right side non-display portion 54 close to the lower side non-display portion 52.

Figure 8:
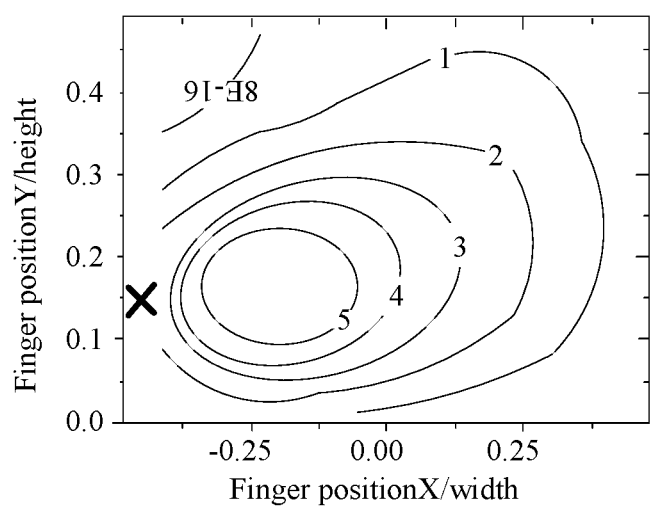
FIG. 8 is a second simulation diagram showing a force sensing range of a force sensing unit according to an embodiment of the present disclosure.

Please refer to FIG. 8, where FIG. 8 is a simulation diagram showing force sensing response range of the force sensing unit 3 when the force sensing unit 3 is arranged at the first non-wiring portion. As shown in FIG. 8, the horizontal and vertical coordinates presents a proportional relation between the width and the length of the display portion 6. The width of the display portion 6 is a length of the display portion 6 along the second direction R, and the length of the display portion 6 is a length of the display portion 6 along the first direction C. When a certain force is applied to the display panel 2 and the display panel 2 is deformed, the sensing intensity of the force sensing unit 3 with respect to the deformation gradually decreases from an portion defined by an innermost curve to a periphery portion. The simulation diagram of the force sensing response range of the force sensing unit when the force sensing unit 3 is arranged at the second non-wiring portion is similar to that in FIG. 8.

Based on the force sensing response range shown in FIG. 8, respectively arranging the force sensing unit 3 at both the left side non-display portion 53 and the right side non-display portion 54 can increase the force sensing range of the force sensing unit 3. Therefore, no matter a press is applied on the left portion, the right portion or the lower portion of the display panel 2, the deformation caused can be within the force sensing range of the force sensing unit 3, so that the force sensing unit 3 can accurately sense the force, thereby improving sensing accuracy.

For example, when the number of the force sensing unit 3 is 2M and M is a positive integer greater than or equal to 1, M force sensing units 3 can be arranged in the first non-wiring portion, and the remaining M force sensing units 3 can be arranged in the second non-wiring portion. In order to make the force sensing units 3 uniformly distributed, for the M force sensing units 3 arranged in the first non-wiring portion, a distance between any two adjacent force sensing units 3 can be identical in the second direction R. Similarly, for the M force sensing units 3 arranged in the second non-wiring portion, a distance between any two adjacent force sensing units 3 can be identical in the second direction R.

It should be noted that, for a conventional display device, considering the usage habit of the user and the operability, the force sensing units 3 are arranged in the lower side non-display portion 52, the portion of the left side non-display portion 53 close to the lower side non-display portion 52, and/or the portion of the right side non-display portion 54 close to the lower side non-display portion 52. However, the above manner shall not be interpreted as a limitation to the arrangement position of the force sensing units 3. For other types of display device, the arrangement position of the force sensing units 3 can be specifically set according to usage habit of the user. For example, for a circular display device, the force sensing units 3 can be arranged as a circle surrounding a ring-shaped non-display portion 5.

In addition, in order to further reduce a width of the border corresponding to the non-display portion 5, the processing unit 4 can be integrated into a driving chip, so that there is no need to preserve a position for arranging the processing unit 4 in the non-display portion 5, thereby further reducing the width of the border.

Figure 9:
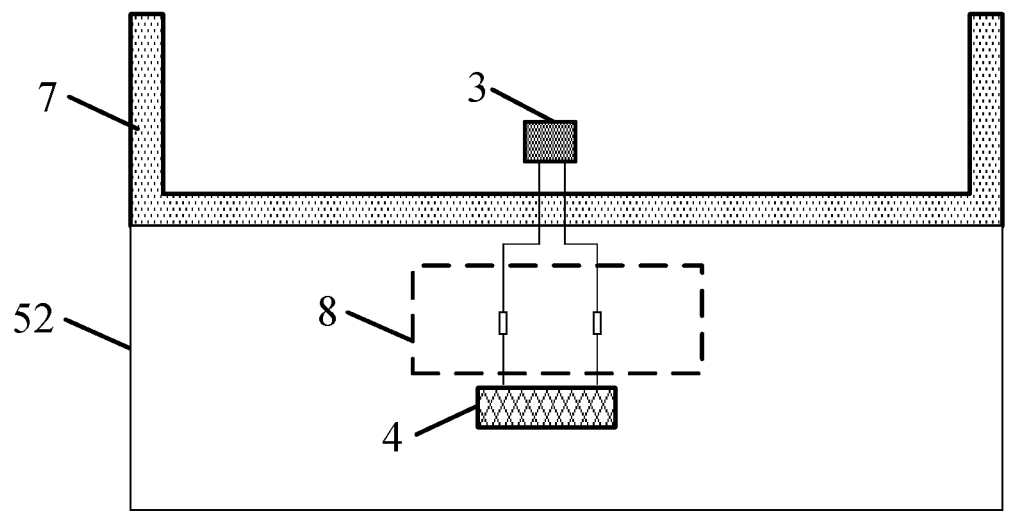
FIG. 9 is a first partial structural schematic diagram of a display device according to an embodiment of the present disclosure.

As shown in FIG. 9, where FIG. 9 is a first partial structural schematic diagram of a display device according to an embodiment of the present disclosure, a bonding portion 8 is further provided in the non-display portion 5 on a side of the sealant 7 facing away from the display portion 6. In one embodiment, the force sensing unit 3 and the processing unit 4 each can be connected to a pin of the bonding portion 8, so that the force sensing unit 3 and the processing unit 4 are connected to each other.

Taking the processing unit 4 integrated in the driving chip as an example, according to the setting manner of the driving chip, the setting manners of the force sensing unit 3 and the processing unit 4 are described as below:

I. When the driving chip is arranged in the non-display portion 5, the bonding portion 8 of the display panel 2 includes a chip bonding portion for bonding the driving chip, and a circuit board bonding portion for bonding a flexible circuit board. The processing unit 4 integrated in the driving chip is connected to a pin of the chip bonding portion and the force sensing unit 3 is connected to a pin of the chip bonding portion or a pin of the circuit board bonding portion.

Figure 10:
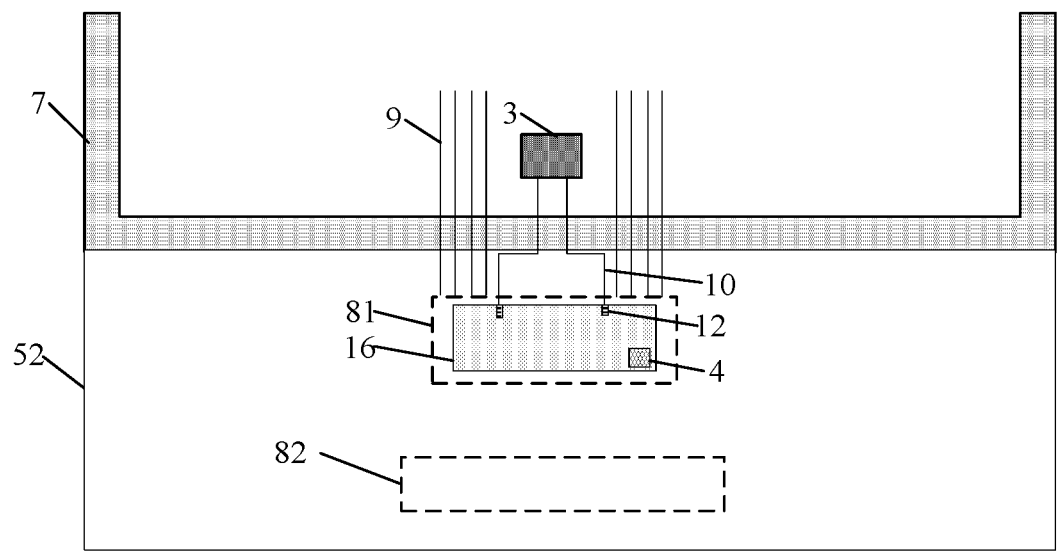
FIG. 10 is a second partial structural schematic diagram of a display device according to an embodiment of the present disclosure.

First, it should be noted that, as shown in FIG. 10, where FIG. 10 is a second partial structural schematic diagram of a display device according to an embodiment of the present disclosure, when the driving chip 16 is bound on the chip bonding portion 81, the driving chip 16 is located in the chip bonding portion 81, and the driving chip 16 and the pin in the chip bonding portion 81 are connected to each other by pressure welding. After the driving chip 16 and the pin in the chip bonding portion 81 are pressure welded, the processing unit 4 integrated in the driving chip 16 is electrically connected to the pin.

Take a situation in which the number of the force sensing unit 3 is one and the one force sensing unit 3 is arranged in the non-wiring portion of the lower side non-display portion 52 as an example. For example, further with reference to FIG. 10, the non-display portion 5 is provided with a first metal wiring 9, the chip bonding portion 81 is provided with a first pin 12, and the processing unit 4 and the force sensing unit 3 are respectively connected to the first pin 12. Since the first metal wiring 9 is not arranged between the force sensing unit 3 and the chip bonding portion 81, a second metal wiring 10 connected to the force sensing unit 3 is directly connected to the first pin 12. The second metal wiring 10 and the first metal wiring 9 can be arranged in the same layer.

It should be noted that the first metal wiring 9 is a metal wiring in the non-display portion except the second metal wiring 10. The first metal wiring 9 includes a plurality of types of metal wirings, such as data signal lines connected to the driving chip 16 for transmitting data signals to the data lines in the display portion.

Figure 11:
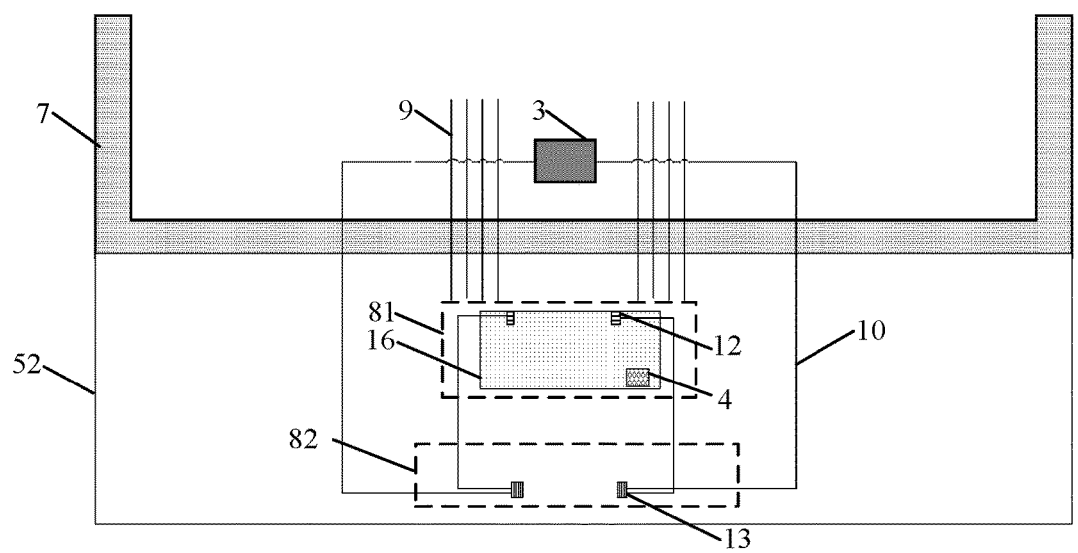
FIG. 11 is a third partial structural schematic diagram of a display device according to an embodiment of the present disclosure.

For example, as shown in FIG. 11, where FIG. 11 is a third partial structural schematic diagram of a display device according to an embodiment of the present disclosure, a second pin 13 is arranged in the circuit board bonding portion 82, the processing unit 4 is connected to the first pin 12, and the force sensing unit 3 is connected to the second pin 13. In addition, in order to achieve the electrical connection between the force sensing unit 3 and the processing unit 4, the second pin 13 is further connected to the first pin 12. Since the first metal wiring 9 is arranged between the force sensing unit 3 and the circuit board bonding portion 82, if the force sensing unit 3 is to be connected to the second pin 13 of the circuit board bonding portion 82, it is necessary to cross the first metal wiring 9, that is, a second metal wiring 10 connected to the force sensing unit 3 shall be bridged to the first pin 13.

Figure 12:
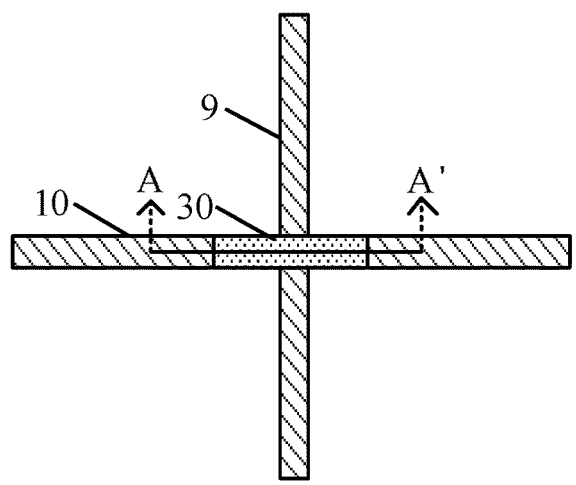
FIG. 12 is a top view of a bridging arrangement of a second metal wiring according to an embodiment of the present disclosure.
Figure 13:
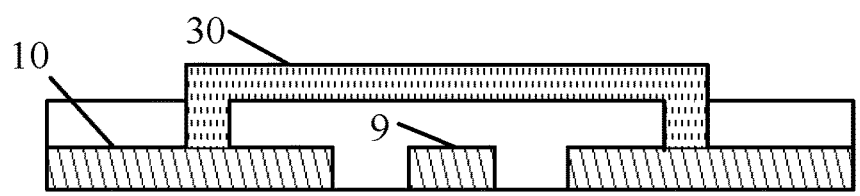
FIG. 13 is a cross-sectional view of FIG. 12 along a direction A-A'.

With reference to FIG. 12 and FIG. 13, FIG. 12 is a top view of a bridging arrangement of a second metal wiring according to an embodiment of the present disclosure; and FIG. 13 is a cross-sectional view of FIG. 12 along A-A' direction. When the first metal wiring 9 is arranged between the force sensing unit 3 and the chip bonding portion 81, during arranging the second metal wiring 10 connected to the force sensing unit 3, a third metal wiring 30 is needed to be arranged at an overlapping portion of the second metal wiring 10 and the first metal wiring 9 to achieve the connection of the second metal wiring 10, so as to avoid signal crosstalk. The third metal wiring 30 is made of a metallic material different from the metallic material of the first metal wiring 9 and the second metal wiring 10.

Figure 14:
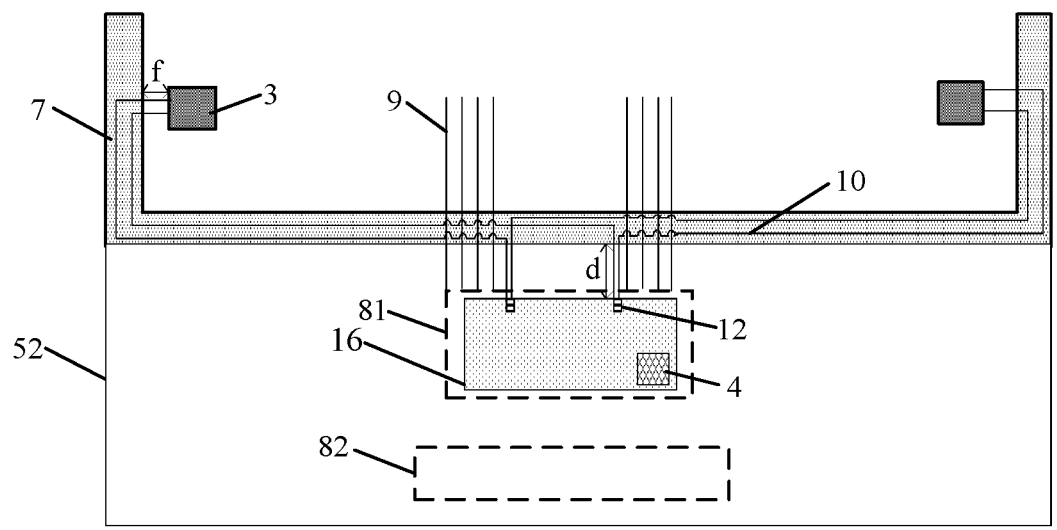
FIG. 14 is a fourth partial structural schematic diagram of a display device according to an embodiment of the present disclosure.

Take a situation in which the number of the force sensing unit 3 is two and the two force sensing units 3 are respectively arranged in the first non-wiring portion of the left side non-display portion 53 and the second non-wiring portion of the right side non-display portion 54 as an example. For example, as shown in FIG. 14, where FIG. 14 is a fourth partial structural schematic diagram of a display device according to an embodiment of the present disclosure, the non-display portion 5 is provided with a first metal wiring 9, the chip bonding portion 81 is provided with a first pin 12, and the processing unit 4 and the force sensing unit 3 are respectively connected to the first pin 12. Since the first metal wiring 9 is arranged between the force sensing unit 3 and the chip bonding portion 81, if the force sensing unit 3 is to be connected to the first pin 12, it is necessary to cross the first metal wiring 9, that is, a second metal wiring 10 connected to the force sensing unit 3 shall be bridged to the first pin 12.

Figure 15:
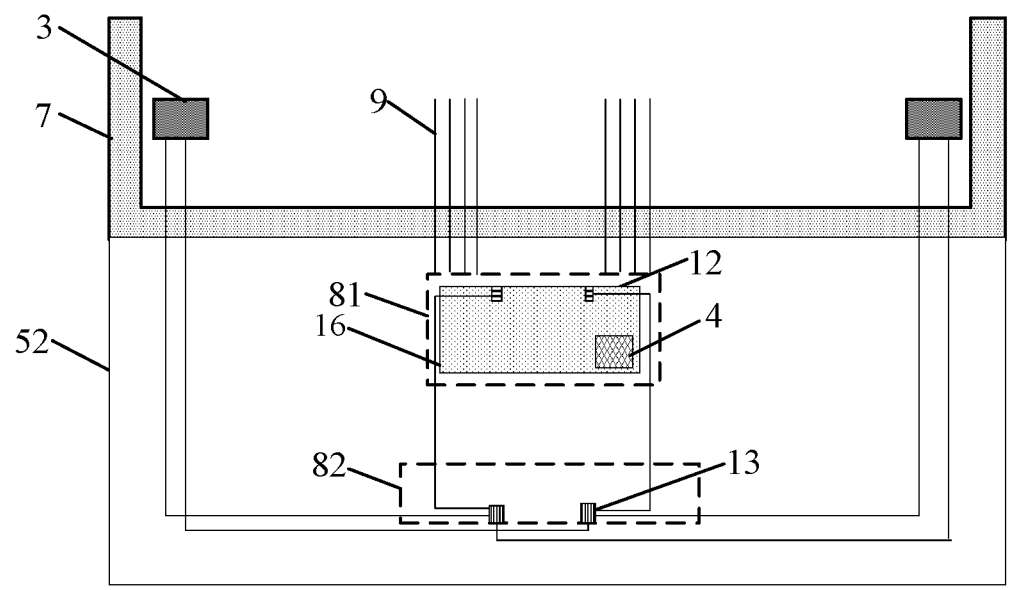
FIG. 15 is a fifth partial structural schematic diagram of a display device according to an embodiment of the present disclosure.

For example, as shown in FIG. 15, where FIG. 15 is a fifth partial structural schematic diagram of a display device according to an embodiment of the present disclosure, a second pin 13 is arranged in the circuit board bonding portion 82, the processing unit 4 is connected to the first pin 12, and the force sensing unit 3 is connected to the second pin 13. In addition, in order to achieve the electrical connection between the force sensing unit 3 and the processing unit 4, the second pin 13 is further connected to the first pin 12. Since there is no first metal wiring 9 arranged between the force sensing unit 3 and the circuit board bonding portion 82, a second metal wiring 10 connected to the force sensing unit 3 is directly connected to the second pin 13.

It should be noted that, for different display devices, the arrangement positions of the force sensing unit 3, the chip bonding portion 81, the circuit board bonding portion 82 and the first metal wiring 9 may be different. Therefore, the first metal wiring 9 may not be arranged between the force sensing unit 3 and the chip bonding portion 81, or the first metal wiring 9 may not be arranged between the force sensing unit 3 and the circuit board bonding portion 82. Since bridging of the metal wiring increases process difficulties, in order to reduce the process difficulties, the force sensing unit 3 can in one embodiment be connected to a bonding portion which can be directly connected to. That is, when the processing unit 4 is to be connected to the first pin 12 of the chip bonding portion 81, if the first metal wiring 9 is not arranged between the force sensing unit 3 and the chip bonding portion 81, the force sensing unit 3 is connected to the first pin 12, and if the first metal wiring 9 is not arranged between the force sensing unit 3 and the circuit board bonding portion 82, the metal wiring of the force sensing unit 3 is connected to the second pin 13 and then the second pin 13 is connected to the first pin 12.

In a situation in which the first metal wiring 9 is arranged between the force sensing unit 3 and the chip bonding portion 81 and also between the force sensing unit 3 and the circuit board bonding portion 82, if the number of the first metal wiring 9 arranged between the force sensing unit 3 and the chip bonding portion 81 is less than the number of the first metal wiring 9 arranged between the force sensing unit 3 and the circuit board bonding portion 82, the force sensing unit 3 can be connected to the chip bonding portion 81; and if the number of the first metal wiring 9 arranged between the force sensing unit 3 and the chip bonding portion 81 is greater than the number of the first metal wiring 9 arranged between the force sensing unit 3 and the circuit board bonding portion 82, the force sensing unit 3 can be connected to the circuit board bonding portion 82.

II. When the driving chip is fixed on a flexible circuit board, the bonding portion of the display panel includes a circuit board bonding portion for bonding the flexible circuit board. The flexible circuit board is connected to a pin of the circuit board bonding portion, so that the driving chip fixed on the flexible circuit board is connected to the pin, thereby achieving the electrical connection between the processing unit integrated in the driving chip and the pin. At this time, the force sensing unit is connected to the pin of the circuit board bonding portion.

Figure 16:
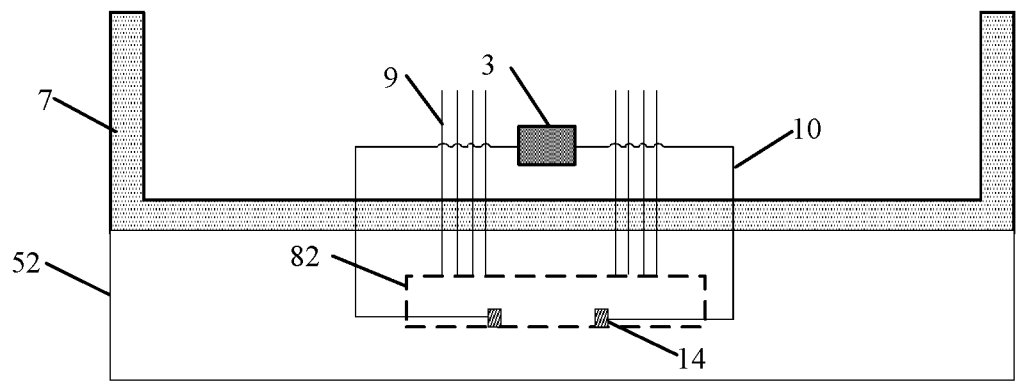
FIG. 16 is a sixth partial structural schematic diagram of a display device according to an embodiment of the present disclosure.

Take a situation in which the number of the force sensing unit 3 is one and the one force sensing unit 3 is arranged in the non-wiring portion of the lower side non-display portion 52 as an example. For example, as shown in FIG. 16, where FIG. 16 is a sixth partial structural schematic diagram of a display device according to an embodiment of the present disclosure, the non-display portion 5 is provided with a first metal wiring 9, the circuit board bonding portion 82 is provided with a third pin 14, and the processing unit (not shown in the figure) and the force sensing unit 3 are respectively connected to the third pin 14. Since the first metal wiring 9 is arranged between the force sensing unit 3 and the circuit board bonding portion 82, a second metal wiring 10 connected to the force sensing unit 3 is bridged to the third pin 14. In the present embodiment, the circuit board bonding portion 82 is configured to bond the flexible circuit board (not shown in the figure), which will not be further described herein.

Figure 17:
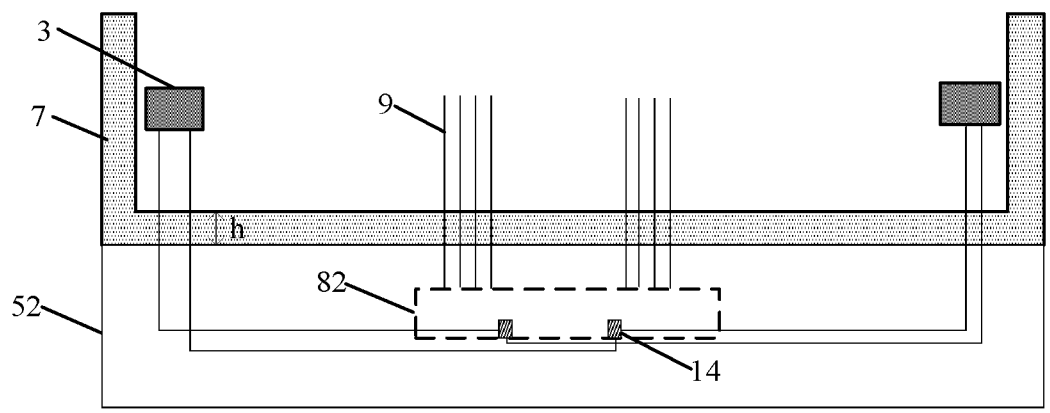
FIG. 17 is a seventh partial structural schematic diagram of a display device according to an embodiment of the present disclosure.

Taking a situation in which the number of the force sensing unit 3 is two and the two force sensing units 3 are arranged in the first non-wiring portion of the left side non-display portion 53 and the second non-wiring portion of the right side non-display portion 54, respectively, as an example. For example, as shown in FIG. 17, where FIG. 17 is a seventh partial structural schematic diagram of a display device according to an embodiment of the present disclosure, the circuit board bonding portion 82 is provided with a third pin 14, and the processing unit (not shown in the figure) and the force sensing unit 3 are respectively connected to the third pin 14. Since the first metal wiring 9 is not arranged between the force sensing unit 3 and the circuit board bonding portion 82, a second metal wiring 10 connected to the force sensing unit 3 is directly connected to the third pin 14.

It should be noted that, for different display devices, the arrangement positions of the force sensing unit 3, the circuit board bonding portion 82 and the first metal wiring 9 may be different. Therefore, the first metal wiring 9 may be arranged between the force sensing unit 3 and the circuit board bonding portion 82, or the first metal wiring 9 may not be arranged between the force sensing unit 3 and the circuit board bonding portion 82. When the first metal wiring 9 is arranged between the force sensing unit 3 and the circuit board bonding portion 82, a second metal wiring 10 connected to the force sensing unit 3 is bridged to the pin of the circuit board bonding portion 82 through a bridging connection. When the first metal wiring 9 is not arranged between the force sensing unit 3 and the circuit board bonding portion 82, a second metal wiring 10 connected to the force sensing unit 3 is directly connected to the pin of the circuit board bonding portion 82.

Figure 18:
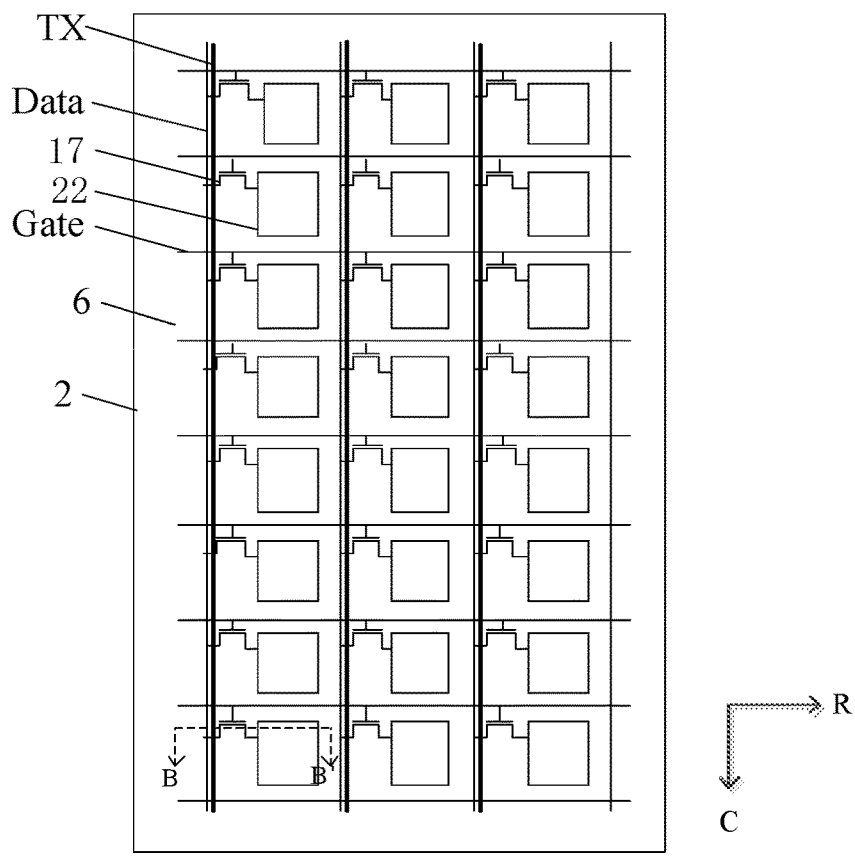
FIG. 18 is a top view of a display device according to an embodiment of the present disclosure.
Figure 19:
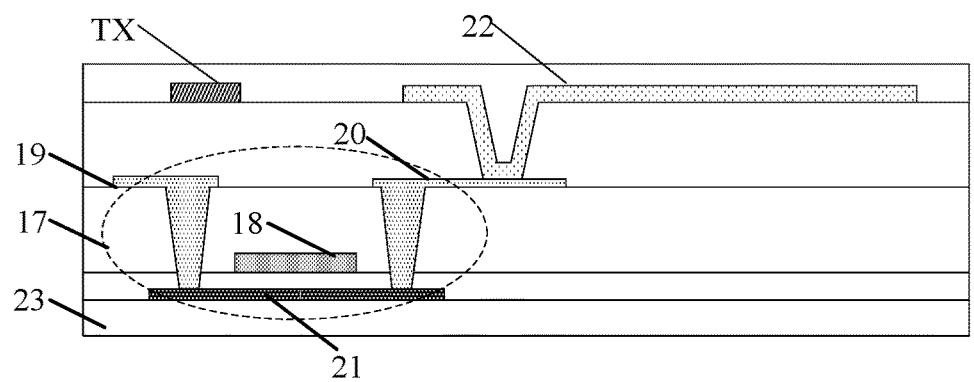
FIG. 19 is a cross-sectional view of FIG. 18 along a direction B-B'.

In addition, please refer to FIG. 18 and FIG. 19, where FIG. 18 is a top view of a display device according to an embodiment of the present disclosure and FIG. 19 is a cross-sectional view of FIG. 18 along a direction B-B'. The display panel 2 includes an array substrate and the array substrate includes a base substrate 23 corresponding to the portion where the display portion 6 is located. A plurality of gate lines Gate and a plurality of data lines Data are arranged on the base substrate 23. The plurality of gate lines Gate and the plurality of data lines Data intersect and are insulated from one another, to define a plurality of sub-pixels. Each sub-pixel includes a thin film transistor 17 and a pixel electrode 22. The thin film transistor 17 includes a gate electrode 18, a source electrode 19, a drain electrode 20 and an active layer 21. The gate electrode 18 of the thin film transistor 17 is connected to the gate line Gate, the source electrode 19 is connected to the data line Data, and the drain electrode 20 is connected to the pixel electrode 22. In addition, the gate electrode 18 and the gate line Gate are arranged in the same layer. The source electrode 19, the drain electrode 20 and the data line Date are arranged in the same layer. Moreover, the display panel 2 further includes a plurality of touch electrodes (not shown in the figure) and a plurality of touch signal lines TX for driving the touch electrodes. Each touch signal line TX is electrically connected to one touch electrode. A layer where the touch signal line TX is located is on a side of the gate line Gate and the data line Data facing away from the base substrate 23. The touch signal line TX is configured to transmit a touch driving signal to the touch electrode, and receive a touch sensing signal from the touch electrode, so as to determine the touch position.

It should be noted that, when the display panel 2 is a liquid crystal display panel, the display panel 2 further includes a color film substrate opposite to the array substrate, and a liquid crystal layer between the array substrate and the color film substrate. The array substrate further includes a common electrode (not shown in the figure). The data line Data corresponding to the source electrode 19 of the thin film transistor charges/discharges to the pixel electrode 22 corresponding to the drain electrode 20 through the thin film transistor 17 under the control of a corresponding gate line Gate. An electric field is formed between the pixel electrode 22 and the common electrode. The electric field between the pixel electrode 22 and the common electrode controls deflection of the liquid crystal molecules, thereby achieving the display function.

In order to simplify the process flow and reduce the manufacturing cost, the second metal wiring 10 and the gate line Gate are arranged in the same layer, or the second metal wiring 10 and the data line Data are arranged in the same layer, or the second metal wiring 10 and the touch signal line TX are arranged in the same layer.

When the second metal wiring 10 and the touch signal line TX are arranged in the same layer, the film layer where the touch signal line TX is located is on a side of the source electrode 19 and the drain electrode 20 facing away from the base substrate 23. That is, compared with the gate line Gate and the data line Data, the film layer where the touch signal line TX is located on a side close to the sealant 7. Therefore, in order to alleviate the corrosion to the second metal wiring 10 by the sealant 7, the second metal wiring 10 shall not overlap the sealant 7, that is, to set an orthogonal projection of the second metal wiring 10 on a plane where the display panel is located to be outside an orthogonal projection of the sealant 7 on the plane where the display panel is located.

As shown in FIG. 17, an edge of the sealant 7 facing toward the display portion 6 is referred to as an inner edge, and an edge of the sealant 7 facing toward the non-display portion 5 is referred to as an outer edge. Assuming the length of the second metal wiring is k, and a width between the inner edge and outer edge of the sealant is h, h<k. The second metal wiring whose length is h can be arranged below the sealant 7, that is, the orthogonal projection of this part of second metal wiring on the plane where the display panel is located is within the orthogonal projection of the sealant 7 on the plane where the display panel is located. Then, the orthogonal projection of the remaining part of the second metal wiring on the plane where the display panel is located is outside the orthogonal projection of the sealant 7 on the plane where the display panel is located. Specifically, a part of the remaining part of the second metal wiring extends along the first direction C on an inner side of the sealant, and another part of the remaining part of the second metal wiring extends along the second direction R on an outer side of the sealant. Therefore, only a part of the second metal wiring whose length is h may be corroded by the sealant 7, and the remaining part of the second metal wiring 10 will not be corroded by the sealant 7, so as to reduce the adverse influence of the sealant 7 on the second metal wiring 10.

When the second metal wiring 10 and the gate line Gate or the data line Data are arranged in the same layer, since the film layer where the gate line Gate is located and the film layer where the data line Data is located are far from the sealant 7, the second metal wiring 10 arranged in the same layer as the gate line Gate or the data line Data will not be corroded by the sealant 7. In addition, in order to further reduce the width of the border, it is preferable that the second metal wiring 10 is arranged below the sealant 7, that is, it is preferable that the orthogonal projection of the second metal wiring 10 on the plane where the display panel 2 is located is located within the orthogonal projection of the sealant 7 on the plane where the display panel 2 is located.

Alternatively, the edge of the sealant 7 facing toward the display portion 6 is referred to as an inner edge, and the edge of the sealant 7 facing toward the non-display portion 5 is referred to as an outer edge. Assuming the length of the second metal wiring is k, a distance between the force sensing unit 3 and a first inner edge of the sealant 7 is f, and a distance between a first outer edge of the sealant 7 and the pin of the bonding portion connected to the force sensing unit 3 is d. The first inner edge is an inner edge of the sealant 7 closest to the force sensing unit 3, and the first outer edge is an outer edge of the sealant 7 closest to the bonding portion connected to the force sensing unit 3, f<k, d<k, and f+d<k.

It is arranged that the part of the second metal wiring whose length is f extends on the inner side of the sealant 7, the part of the second metal wiring whose length is d extends on the outer side of the sealant 7, and the part of the second metal wiring whose length is k-f-d is arranged below the sealant 7. That is, the orthogonal projection of this part of second metal wiring with the length of k-f-d on the plane where the display panel is located is within the orthogonal projection of the sealant 7 on the plane where the display panel 2 is located.

Taking a situation in which the force sensing unit 3 is connected to the first pin 12 of the chip bonding portion 81 shown in FIG. 14 as an example, the distance between the force sensing unit 3 and the first inner edge of the sealant 7 is f, the distance between the first outer edge of the sealant 7 and the first pin 12 of the chip bonding portion 81 is d, the part of the second metal wiring having the length of k-f-d is arranged by totally overlapping the sealant 7 along an extending direction of the sealant 7, and only the part of the second metal wiring having the length of f and the part of the second metal wiring having the length of d are exposed outside the sealant. Therefore, only the parts of the second metal wiring having a total length of f+d occupy an extra area in the non-display portion 5, and other parts of the second metal wiring do not occupy extra space, so as to reduce the border width to a certain extent.

The processing unit 4 can include a comparator and a controller. The comparator is connected to the force sensing unit 3, and is configured to compare the force signal output by the force sensing unit 3 with a threshold force signal stored therein, and then output a comparison result to the controller. The controller is connected to the comparator, and is configured to control the display portion 6 of the display panel 2 to display a preset functional interface when the force signal exceeds or is greater than the threshold force signal.

Figure 20:
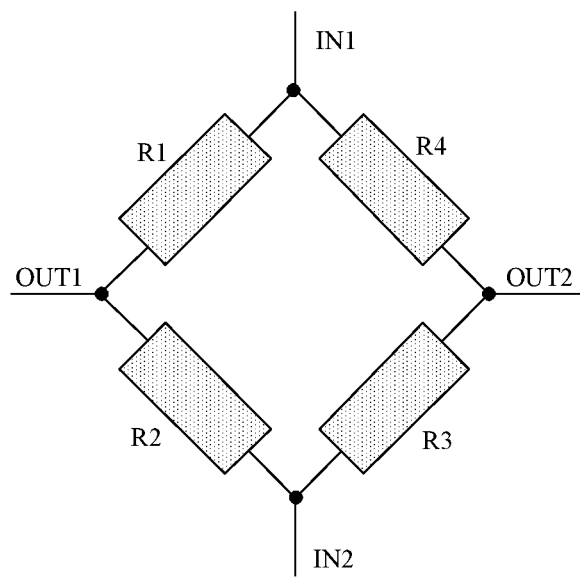
FIG. 20 is a first structural schematic diagram of a force sensing unit according to an embodiment of the present disclosure.

In one embodiment, the above force sensing unit 3 can be a Whetstone bridge force sensor. As shown in FIG. 20, where FIG. 20 is a first structural schematic diagram of a force sensing unit according to an embodiment of the present disclosure, the Whetstone bridge force sensor includes a first input end IN1, a second input end IN2, a first output end OUT1, a second output end OUT2, a first resistor R1 connected in series between the first input end IN1 and the first output end OUT1, a second resistor R2 connected in series between the first output end OUT1 and the second input end IN2, a third resistor R3 connected in series between the second input end IN2 and the second output end OUT2, and a fourth resistor R4 connected in series between the second output end OUT2 and the first input end IN1.

When the display panel 2 is not deformed, the Whetstone bridge is in a balanced state, that is, a ratio of a resistance of the first resistor R1 to a resistance of the second resistor R2 is equal to a ratio of a resistance of the fourth resistor R4 to a resistance of the third resistor R3, and a voltage of the first output end OUT1 is equal to a voltage of the second output end OUT2.

When a force is applied to the display panel 2 and the display panel 2 is deformed, all of the first resistor R1, the second resistor R2, the third resistor R3 and the fourth resistor R4 will be deformed. As a result, the resistance of each resistor will be changed, and the balanced state of the Whetstone bridge is broken. That is, the ratio of the resistance of the first resistor R1 to the resistance of the second resistor R2 is not equal to the ratio of the resistance of the fourth resistor R4 to the resistance of the third resistor R3, and the voltage of the first output end OUT1 is not equal to the voltage of the second output end OUT2. The difference between the voltage of the first output end OUT1 and the voltage of the second output end OUT2 has a corresponding relation with the force suffered by the display panel 2. Therefore, the force can be obtained based on the voltage of the first output end OUT1, the voltage of the second output end OUT2, and the corresponding relation.

Figure 21:
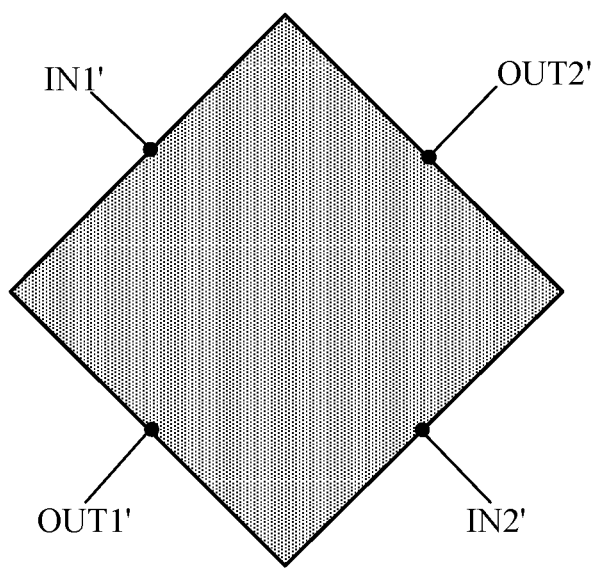
FIG. 21 is a second structural schematic diagram of a force sensing unit according to an embodiment of the present disclosure.

In one embodiment, the above force sensing unit 3 can also be a silicon piezoresistive force sensor. As shown in FIG. 21, where FIG. 21 is a second structural schematic diagram of a force sensing unit according to an embodiment of the present disclosure, the silicon piezoresistive force sensor can be an integral sheet-like quadrilateral structure, the four edges of the quadrilateral structure are connected to a first input end IN1', a second input end IN2', a first output end OUT1' and a second output end OUT2', respectively. The first input end IN1' and the second input end IN2' are connected to two opposite edges, respectively, and the first output end OUT1' and the second output end OUT2' are connected to the other two opposite edges, respectively. The first input end IN1' and the second input end IN2' apply a bias voltage to the silicon piezoresistive force sensor.

When a force is applied to the display panel 2 and the display panel 2 is deformed, the resistance of the silicon piezoresistive force sensor is changed, the signals output by the first output end OUT1' and the second output end OUT2' are changed accordingly, then the force sensed by the silicon piezoresistive force sensor can be detected through the changes of voltages on the first output end OUT1' and the second output end OUT2'.

It should be further noted that the display device provided in the present disclosure can be any electronic device having display function such as touch display screen, cellphone, tablet computer, laptop computer or television, which will not be repeated herein.

The above contents only show preferred embodiments of the present disclosure, which shall not be interpreted as limitations to the present disclosure. Any modification, equivalent substitution and improvements made within principles of the present disclosure shall fall into the protection scope of the present disclosure.

What is claimed is:

1. A display device, comprising:
    a display panel comprising a display portion and a non-display portion;
    a force sensor provided in a non-wiring portion of the non-display portion to sense a force applied on the display panel and output a force signal corresponding to the force; and
    a driving chip connected to the force sensor to control the display portion to display a preset functional interface according to the force signal output from the force sensor,
    wherein the non-display portion is provided with a sealant and the force sensor is arranged on a side of the sealant facing toward the display portion,
    the non-display portion comprises a bonding portion, and the force sensor and the driving chip are connected to each other by a pin of the bonding portion, and
    a first metal wiring is arranged between the force sensor and the bonding portion, and a second metal wiring connected to the force sensor is bridged to the bonding portion.

2. The display device according to claim 1, wherein the non-display portion comprises an upper side non-display portion and a lower side non-display portion arranged along a first direction, and the lower side non-display portion comprises a bonding portion; and
    a number of the force sensor is one, and the one force sensor is arranged in a non-wiring portion in a middle portion of the lower side non-display portion.

3. The display device according to claim 1, wherein the non-display portion comprises an upper side non-display portion and a lower side non-display portion arranged along a first direction, and the lower side non-display portion comprises a bonding portion;
    the number of the force sensor is more than one, and the more than one force sensors are arranged in the lower side non-display portion, wherein a distance between any two adjacent force sensors of the more than one sensors is identical in a second direction; and
    the first direction and the second direction are perpendicular to each other.

4. The display device according to claim 1, wherein the non-display portion comprises a left side non-display portion, a right side non-display portion, an upper side non-display portion, and a lower side non-display portion, the upper side non-display portion and the lower side non-display portion are arranged along a first direction Y, the left side non-display portion and the right side non-display portion are arranged along a second direction, and the lower side non-display portion comprises a bonding portion, wherein the first direction and the second direction are perpendicular to each other;
    the force sensor is arranged in at least one of a first non-wiring portion or a second non-wiring portion, wherein the first non-wiring portion is a portion of a non-wiring portion of the left side non-display portion close to the lower side non-display portion, and the second non-wiring portion is a portion of a non-wiring portion of the right side non-display portion close to the lower side non-display portion.

5. The display device according to claim 4, wherein the number of the force sensor is 2M and M is a positive integer greater than or equal to 1, wherein M force sensors of the 2M force sensors are arranged in the first non-wiring portion, and the other M force sensors of the 2M force sensors are arranged in the second non-wiring portion.

6. The display device according to claim 1, wherein the driving chip is arranged in the non-display portion;
    the bonding portion comprises a chip bonding portion and a circuit board bonding portion, the chip bonding portion is configured to bond the driving chip, and the circuit board bonding portion is configured to bond a flexible circuit board; and the driving chip is connected to a pin of the chip bonding portion, and the force sensor is connected to the pin of the chip bonding portion or a pin of the circuit board bonding portion.

7. The display device according to claim 6, wherein the chip bonding portion is provided with a first pin;
    the driving chip is connected to the first pin, no first metal wiring is arranged between the force sensor and the chip bonding portion, and the force sensor is connected to the first pin by a second metal wiring.

8. The display device according to claim 6, wherein the chip bonding portion is provided with a first pin, and the circuit board bonding portion is provided with a second pin;
    the driving chip is connected to the first pin, no first metal wiring is arranged between the force sensor and the circuit board bonding portion, the force sensor is connected to the second pin by a second metal wiring, and the second pin is connected to the first pin.

9. The display device according to claim 1, wherein the driving chip is arranged in a flexible circuit board;
    the bonding portion comprises a circuit board bonding portion, and the circuit board bonding portion is configured to bond the flexible circuit board; the driving chip is connected to a pin of the circuit board bonding portion, and the force sensor is connected to the pin of the circuit board bonding portion by a second metal wiring.

10. The display device according to claim 7, wherein the display panel comprises an array substrate, the array substrate comprises a base substrate, a plurality of gate lines and a plurality of data lines, the plurality of gate lines and the plurality of data lines are located on the base substrate, and the plurality of gate lines and the plurality of data lines intersect and are insulated from one another to define a plurality of sub-pixels;
    the array substrate further comprises a plurality of touch electrodes and a plurality of touch signal lines, each of the plurality of touch signal lines is electrically connected to one touch electrode of the plurality of touch electrodes, and the plurality of touch signal lines is arranged on a side of the plurality of gate lines and the plurality of data lines facing away from the base substrate.

11. The display device according to claim 10, wherein the second metal wiring and the touch signal lines are arranged in a same layer, and a length of the second metal wiring is k;

a width between an inner edge and an outer edge of the sealant is h, wherein the inner edge is an edge of the sealant facing toward the display portion, the outer edge is an edge of the sealant facing toward the non-display portion, and h<k;

an orthogonal projection of a part of the second metal wiring having a length of h on a plane where the display panel is located is located within an orthogonal projection of the sealant on the plane where the display panel is located;

an orthogonal projection of the remaining part of the second metal wiring on the plane where the display panel is located is located outside the orthogonal projection of the sealant on the plane where the display panel is located.

12. The display device according to claim 10, wherein the second metal wiring and the plurality of gate lines or the plurality of data lines are arranged in a same layer, and a length of the second metal wiring is k;

a distance between the force sensor and a first inner edge of the sealant is f, the first inner edge is an inner edge of the sealant closest to the force sensor, the inner edge is an edge of the sealant facing toward the display portion, and f<k; and a part of the second metal wiring having a length of f extends on an inner side of the sealant;

a distance between a first outer edge of the sealant and the pin of the bonding portion connected to the force sensor is d, and the first outer edge is an outer edge of the sealant closest to the bonding portion, the outer edge is an edge of the sealant facing toward the non-display portion, and d<k; and a part of the second metal wiring having a length of d extends on an outer side of the sealant;

an orthogonal projection of a part of the second metal wiring having a length of k-f-d on the plane where the display panel is located is located within an orthogonal projection of the sealant on the plane where the display panel is located.

13. The display device according to claim 1, wherein the driving chip comprises a comparator and a controller;

the comparator is connected to the force sensor, and the comparator is configured to compare a force signal output by the force sensor with a stored threshold force signal and then output a comparison result to the controller;

the controller is connected to the comparator and is configured to control the display portion of the display panel to display a preset functional interface when the force signal is greater than the threshold force signal.

14. The display device according to claim 1, wherein the force sensor is a Whetstone bridge force sensor;

the Whetstone bridge force sensor comprises a first input end and, a second input end, a first output end, a second output end, a first resistor connected in series between the first input end and the first output end, a second resistor connected in series between the first output end and the second input end, a third resistor connected in series between the second input end and the second output end, and a fourth resistor connected in series between the second output end and the first input end.

15. The display device according to claim 1, wherein the force sensor is a silicon piezoresistive force sensor.

* * * * *